(12) United States Patent
Vincent et al.

(10) Patent No.: US 6,388,948 B1
(45) Date of Patent: May 14, 2002

(54) METHOD AND SYSTEM FOR DETERMINING UNDERWATER EFFECTIVE SOUND VELOCITY

(75) Inventors: Harold T. Vincent, North Kingstown; Sau-Lon James Hu, Providence, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/688,473

(22) Filed: Oct. 12, 2000

(51) Int. Cl.[7] ............................................... G01S 15/88
(52) U.S. Cl. ...................................................... 367/89
(58) Field of Search ................................... 367/89, 902

(56) References Cited

U.S. PATENT DOCUMENTS 3,388,372 A * 6/1968 Witz ........................... 367/100
3,441,901 A * 4/1969 Cawley et al. ............... 367/131
3,757,287 A * 9/1973 Bealor, Jr. .................... 367/87

* cited by examiner

Primary Examiner—Daniel T. Pihulic
(74) Attorney, Agent, or Firm—Michael J. McGowan; Prithvi C. Lall; Michael F. Oglo

(57) ABSTRACT

A method and system for determining the effective sound velocity between a source of sound energy located at an initial depth $Z_S$ and an actual target located at another depth. A system utilizing a device such as a computer or microprocessor is used for implementing the method of the present invention. An effective sound velocity ("ESV") matrix is generated wherein ESV values are a function of actual target depth and actual target elevation angle. The ESV matrix is then used to determine the ESV between a source of sound energy located at an initial depth $Z_S$ and an actual target located at any depth between $Z_S$ and a final target depth $Z_T$.

20 Claims, 8 Drawing Sheets

METHOD AND SYSTEM FOR DETERMINING UNDERWATER EFFECTIVE SOUND VELOCITY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to a method and system for determining underwater effective sound velocity.

(2) Description of the Prior Art

In many target tracking scenarios, it is often necessary to determine the effective sound velocity ("ESV") between the source of sound pulses and a target located at a particular depth. The ESV between the two points is the ratio of the slant range and the transit time. The transit time is defined as the time required for sound traveling between the source and the target. The slant range is defined as the straight line distance between the source and the target. Thus, in order to effect a hydrophone survey or ship tracking procedure, the transit time between a pinger and a hydrophone is typically recorded and converted into slant range by multiplying the transit time by the corresponding ESV. The accuracy of the calculated slant range depends upon the accuracy of the ESV. The ESV between two underwater points is difficult to determine because the speed of sound is not homogeneous in the ocean medium.

One conventional method for determining the ESV is the ray tracing method. Typical ray tracing methods focus on the determination of the total travel time and horizontal displacement from a source of sound pulses located at a first depth to a target located at a second depth that is greater than the first depth. In addition to the known quantities, i.e. the water depths of the source of sound pulses and the target, additional information needed to carry out the ray tracing method are the associated: (i) the sound velocity profile ("SVP"), (ii) the horizontal distance between the source of sound pulses and the target, and (iii) incident angle at the starting depth, i.e., the depth of the source of sound pulses. However, in survey or tracking related applications wherein it is desired to determine the ESV between two arbitrary underwater points, the incident angle is not known. Since only the elevation angle is known, use of the ray tracing algorithm to determine the ESV requires a number of iterations wherein each succeeding iteration commences with an improved guess on the incident angle. Thus, it can be seen that ray tracing algorithms are too time consuming. Furthermore, ray tracing methods are only valid for high frequency signals, i.e., when the wavelength is significantly less than (i) the water depth, (ii) the distance from a source sound pulses to the target, and (iii) the distance from target to receiver.

Another conventional method for determining the effective sound velocity ESV is the Taylor series expansion formulas. The information needed for the Taylor series method is: (i) the depth of the source of sound pulses, (ii) the depth of the target, (iii) the horizontal distance between the source of sound pulses and the target, and (iii) the elevation angle. There is no need for iterations in the Taylor series method. The Taylor series expansion formula remains valid for different SVPs and for arbitrary depth segments and is excellent for estimating ESVs under large elevation angles. However, for small elevation angles, the Taylor series formula fails to converge thereby yielding erroneous results. Including higher order Taylor series terms will not improve the solution. On the contrary, adding higher order terms often worsens the solution for small elevation angles. Another disadvantage of the Taylor series method is that since numerical integrations are required, the Taylor series method is relatively more computation-intensive than other conventional methods. A further disadvantage is that the results produced by the Taylor series method must be numerical compared with the results of the detailed ray-tracing method in order to determine the solution accuracy of the Taylor series method, especially for smaller elevation angles.

Another conventional method for determining ESV is an empirical formula method. Although the empirical formula method is probably the most time-economic approach, the derived empirical formula will often be restricted to one or two parameters. Even limiting the applications to only one particular SVP environment such that the horizontal distance is fixed, deriving a formula of ESV as a function of elevation angle and underwater depths of the source of sound pulses and the target is still a relatively difficult curve-fitting problem. The most appealing feature of the empirical approach is its computational efficiency. However, the task of determining the empirical coefficients is laborious. For example, when a change in the SVP or depth of the first underwater point (i.e. the source of sound energy) is imposed, one has to go through a lengthy process of recalculating the empirical coefficients. Furthermore, the accuracy of the formula needs to be verified again.

Therefore, it is an object of the present invention to provide a new and improved method and system for determining the ESV between two underwater points.

It is another object of the present invention to provide a new and improved method and system for determining the ESV between two underwater points that is relatively less time consuming than conventional methods.

It is a further object of the present invention to provide a new and improved method and system for determining the ESV between two underwater points that may be used with high and low frequency signals.

Other objects and advantages of the present invention will be apparent to one of ordinary skill in the art in light of the ensuing description of the present invention.

SUMMARY OF THE INVENTION

The present invention is directed to a method and system for determining the effective sound velocity between underwater points. The system utilizes a device such as a computer or microprocessor for determining the effective sound velocity between the underwater points. The following information is fed into the device: (i) the sound velocity profile from a source of sound energy located at an initial depth to a predetermined final target depth, (ii) a predetermined set of grazing angles, (iii) a predetermined number of target depths between the initial depth and the final target depth, and (iv) a predetermined uniform set of elevation angles. A corresponding elevation angle and an effective sound velocity value is calculated for each grazing angle and target depth. The calculated elevation angles are scanned to locate a pair of calculated elevation angles which correspond to a pair of successive grazing angles and a particular target depth wherein the particular elevation angle of the uniform set is between the pair of calculated elevation angles. The calculated effective sound velocity values corresponding to each elevation angle of the pair of calculated elevation angles are interpolated to produce an interpolated effective sound velocity. The system comprises means for repeating these steps for each target depth fed into the device. Parameters associated with an actual target are then fed into the device. These parameters comprise an actual target depth and an actual target elevation angle. The interpolated effective sound velocities are then scanned to locate an interpolated effective sound velocity that corresponds to an elevation angle of the uniform set and a target depth that matches the actual target elevation angle and actual target depth, respectively. If such an interpolated effective sound velocity is located, it will be the effective sound velocity between the source of sound energy and the actual target.

If it is determined that there is a target depth that matches the actual target depth and there is no elevation angle of the uniform set that matches the actual target elevation angle, then the uniform set of elevation angles is scanned to find a pair of successive elevation angles such that the actual target elevation angle is between the pair of successive elevation angles of the uniform set. The effective sound velocities corresponding to the pair of successive elevation angles of the uniform set and the target depth are then interpolated to produce an effective sound velocity between the source of sound energy and the actual target.

If it is determined that there is no target depth that matches the actual target depth and there is an elevation angle of the uniform set that matches the actual target elevation angle, then the target depths are scanned to locate a pair of successive target depths such that the actual target depth is between the pair of successive target depths. The effective sound velocities corresponding to the pair of successive target depths and the elevation angle of the uniform set are then interpolated to produce an effective sound velocity between the source of sound energy and the actual target.

If it is determined that there is no elevation angle of the uniform set that matches the actual target elevation angle and there is no target depth that matches the actual target depth, then the target depths and the elevation angles of the uniform set are scanned to locate (i) a pair of successive target depths such that the actual target depth is between the pair of successive target depths, and (ii) a pair of successive elevation angles of the uniform set such that the actual target elevation angle is between the pair of successive elevation angles of the uniform set. The effective sound velocities corresponding to the pair of successive target depths and the pair of successive elevation angles of the uniform set are interpolated to produce an effective sound velocity between the source of sound energy and the actual target.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

In describing the preferred embodiments of the present invention, reference will be made herein to FIGS. 1–6C of the drawings in which like numerals refer to like features of the invention.

In accordance with the present invention, an ESV matrix or table is generated and then used to determine the ESV between a source of sound energy located at depth $Z_S$ and an actual target or object located at depth $Z_T$. Accordingly, the method of the present invention generally comprises a first part for generating an ESV matrix and a second part for using the ESV matrix with actual parameters.

Figure 1:
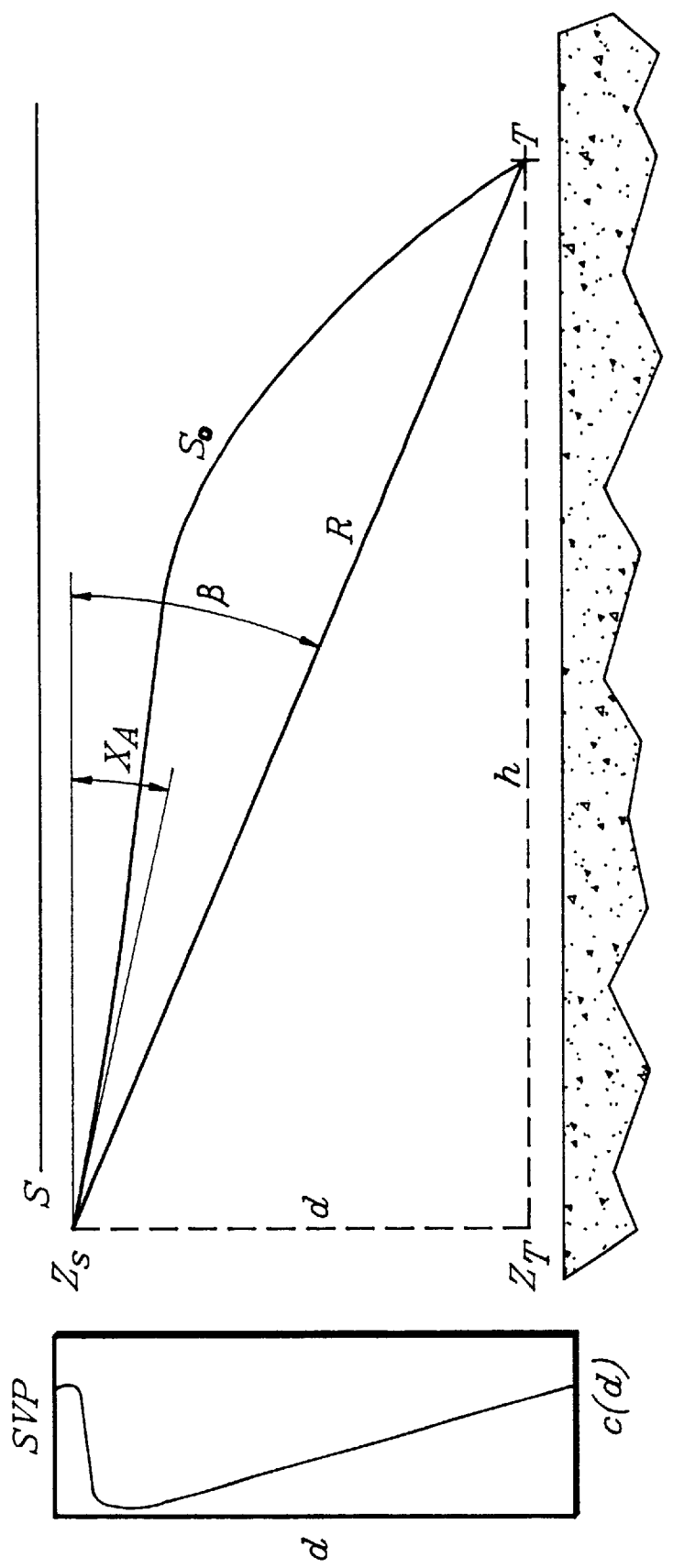
FIG. 1 is a diagram illustrating the variables needed to determine the effective sound velocity between two points.

Referring to FIG. 1, path $S_O$ is a ray path which describes the motion of sound or acoustic energy, e.g., sound pulses or waves, from a source S to a point or target T. In underwater acoustics, ray paths are designated as sonic rays. Sonic rays are typically bent when traveling through sea water. Variations of sonic ray direction from a straight line are due to propagation velocity changes in the sea water medium.

a) The first step of the process for creating or generating the ESV matrix entails specifying (i) the depth $Z_S$ of the source S of the sound energy, (ii) the depth $Z_T$ of target T, and (iii) the sound velocity profile c (d) between $Z_S$ and $Z_T$. If a computer or microprocessor is used to implement the method of the present invention, these values can be fed manually into the computer or microprocessor, i.e., via a keyboard. In order to facilitate understanding of the ensuing description, FIG. 1 shows parameters based only on one target located at depth $Z_T$. However, it is to be understood that the final ESV matrix generated will be in terms of a plurality of target depths. This will be explained in detail below.

b) The next step entails specifying an initial grazing angle $X_A$ and an incremental value for incrementally increasing the grazing angle $X_A$. For example, the initial grazing angle $X_A$ can be 2° with successive grazing angles at 2.0° increments, e.g., 2°, 4°, 6°, 8°, 10°, etc. As shown in FIG. 1, the ray path radiates from the source at $Z_S$ at the initial grazing angle and travels along ray path S to the target T at depth $Z_T$. The path S is comprised of vertical and horizontal distances d and h, respectively. These values can also be fed into the computer or microprocessor.

c) Referring to FIG. 1, the next step entails determining an elevation angle β for each initial grazing $X_A$. In a preferred embodiment, ray-tracing is used to determine the elevation angle β.

d) Referring to FIG. 1, the following information can now be determined after step (c) is implemented: (i) the slant range R, (ii) the horizontal distance h, (iii) the distance of ray path $S_O$, (iv) the transit time $TT_S$ along ray path $S_O$, and (v) the ESV between $Z_S$ and $Z_T$. Thus, for every initial grazing angle $X_A$, there will be a corresponding set of values for β, R, h, $S_O$, $TT_S$ and ESV.

e) The next involves forming a table containing the β and ESV values for each initial grazing angle $X_A$. This is shown below in Table I:

TABLE I

|  | $X_{A1}$ | $X_{A2}$ | $X_{A3}$ | $X_{AM-1}$ | $X_{AM}$ |
|---|---|---|---|---|---|
| $Z_{T1}$ | $β_1$<br>$ESV_1$ | $β_2$<br>$ESV_2$ | $β_3$<br>$ESV_3$ | $β_{M-1}$<br>$ESVM_{M-1}$ | $β_M$<br>$ESV_M$ |

In the ensuing description, the phrase "pairs of successive grazing" is used. Examples of pairs of successive grazing angles are: $(X_{A1}°, X_{A2}°)$, $(X_{A2}°, X_{A3}°)$, $(X_{A3}°, X_{A4}°)$ and $(X_{Am-1}°, X_{AM}°)$.

f) The next step in generating the matrix is to is to specify a uniform set of elevation angle β values that can be used for all depths from $Z_T$ to $Z_{TN}$ inclusive, wherein $Z_{TN}$ is the final or deepest depth. To facilitate description of the method of the present invention and understanding of the ensuing explanation, a uniform set of elevation angles 10°, 12°, 14°, 16°, 18° etc. is chosen. In the ensuing description, the phrase "a pair of successive elevation angles from the uniform set" is used. Examples of pairs of successive elevation angles from the uniform set are: (10°, 12°), (12°, 14°), (14°, 16°) and (16°, 18°). This uniform set of elevation angles forms one dimension of the final ESV matrix. The other dimension of the ESV matrix is target depth $Z_T$ as will be shown below.

g) The next step entails determining the actual ESV values to be used in the ESV matrix. To accomplish this step, Table I is evaluated or scanned to locate a pair of elevation angles that correspond to a pair of successive grazing angles such that a particular β value selected from the uniform set of β values (specified in step (f)) is between the pair of elevation angles. For example, since the first β value in the uniform set is 10° and there is only one target depth $Z_T$, the ESV value for a β value of 10° and a depth of $Z_T$ is determined. For purposes of this example, the pair of successive grazing angles $X_{A1}$ and $X_{B1}$ in Table I correspond to $β_1$=9.3° and $β_2$=10.4°, respectively. Since 10° falls between 9.3° and 10.4°, an interpolation is performed on the ESV values corresponding to $β_1$ and $β_2$, i.e., $ESV_1$ and $ESV_2$. The interpolated value $ESV_{I1}$ becomes the first ESV value in the ESV matrix shown as below as Table II. This step is repeated for every β value in the uniform set of β values. Thus, for example, Table I is evaluated again to find a pair of β values that correspond to a pair of successive grazing angles in which β=12° is between the pair of β values. The ESV matrix will have the format shown in Table II. The notation $IESV_1$ indicates an interpolated ESV value.

TABLE II

| β (degrees) | 10 | 12 | 14 | 16 | $β_M$ |
|---|---|---|---|---|---|
| $Z_{T1}$ (feet) | $IESV_1$ | $IESV_2$ | $IESV_3$ | $IESV_4$ | $IESV_M$ | h) As stated above, the foregoing description has been in terms of one target depth $Z_{T1}$ to facilitate understanding of the method of the present invention. Since an object of the method of the present invention is to generate an ESV matrix that can be used for a plurality of target depths as well as a plurality of elevation angles β, it is to be understood that (i) the SVP specified in step (a) is based on depths ranging from a first specified target depth $Z_{T1}$ to a final target depth $Z_{TN}$ wherein each depth is separated by a predetermined increment, and (ii) steps (b)–(g) are repeated for each target depth. Thus, as a result of repeating steps (b)–(f), Table I is expanded to that shown by Table III.

TABLE III

| $X_A$ (degrees) | $X_{A1}$ | $X_{A2}$ | $X_{A3}$ | $X_{AM-1}$ | $X_{AM}$ |
|---|---|---|---|---|---|
| $Z_T$ (feet) |  |  |  |  |  |
| $Z_{T1}$ | $β_{11}$<br>$ESV_{11}$ | $β_{12}$<br>$ESV_{12}$ | $β_{13}$<br>$ESV_{13}$ | $β_{1M-1}$<br>$ESV_{1M-1}$ | $β_{1M}$<br>$ESV_{1M}$ |
| $Z_{T2}$ | $β_{21}$<br>$ESV_{21}$ | $β_{22}$<br>$ESV_{21}$ | $β_{23}$<br>$ESV_{23}$ | $β_{2M-1}$<br>$ESV_{M-1}$ | $β_{2M}$<br>$ESV_M$ |
| $Z_{T3}$ | $β_{31}$<br>$ESV_{31}$ | $β_{32}$<br>$ESV_{32}$ | $β_{33}$<br>$ESV_{33}$ | $β_{3M-1}$<br>$ESV_{3M-1}$ | $β_{3M}$<br>$ESV_M$ |
| $Z_{T4}$ | $β_{41}$<br>$ESV_{41}$ | $β_{42}$<br>$ESV_{42}$ | $β_{43}$<br>$ESV_{43}$ | $β_{4M-1}$<br>$ESV_{4M-1}$ | $β_{4M}$<br>$ESV_{4M}$ |
| $Z_{T5}$ | $β_{51}$<br>$ESV_{51}$ | $β_{52}$<br>$ESV_{52}$ | $β_{53}$<br>$ESV_{53}$ | $β_{5M}$<br>$ESV_{5M}$ | $β_{5M-1}$<br>$ESV_{5M-1}$ |
| $Z_{T6}$ | $β_{61}$<br>$ESV_{61}$ | $β_{62}$<br>$ESV_{62}$ | $β_{63}$<br>$ESV_{63}$ | $β_{6M-1}$<br>$ESV_{6M-1}$ | $β_{6M}$<br>$ESV_{6M}$ |
| $Z_{TN-1}$ | $β_{(N-1)1}$<br>$ESV_{(N-1)1}$ | $β_{(N-1)2}$<br>$ESV_{(N-1)2}$ | $β_{(N-1)3}$<br>$ESV_{(N-1)3}$ | $β_{(N-1)M-1}$<br>$ESV_{(N-1)M-1}$ | $β_{(N-1)M}$<br>$ESV_{(N-1)M}$ |
| $Z_{TN}$ | $β_{N1}$<br>$ESV_{N1}$ | $β_{N2}$<br>$ESV_{N2}$ | $β_{N3}$<br>$ESV_{N3}$ | $β_{N(M-1)}$<br>$ESV_{N(M-1)}$ | $β_{NM}$<br>$ESV_{NM}$ |

In a preferred embodiment, each pair of successive grazing angles is evaluated or scanned to determine if that pair of grazing angles correspond to a pair of elevation angles that are associated with a particular target depth and that a β value selected from the uniform set of elevation angles (i.e., 10°, 12°, 14°, 16°, etc.) is between the pair of elevation angles. For example, referring to Table III, if the particular β value selected from the uniform set is 10° and the target depth of interest is $Z_{T4}$, then Table III is scanned to find a pair of successive grazing angles that correspond to a pair of elevation angles such that particular β value selected from the uniform set is between the pair of elevation angles. As shown in Table III, the first pair of successive grazing angles $X_{A1}$ and $X_{A2}$ correspond to elevation angles $β_{41}$ and $β_{42}$, respectively. If elevation angles $β_{41}$ and $β_{42}$ are both less than 10°, then no interpolation is done between the corresponding ESV values $ESV_{41}$ and $ESV_{42}$. The pair of elevation angles associated with the next pair of successive grazing angles $X_{A2}$ and $X_{A3}$, i.e., $β_{42}$ and $β_{43}$, are then evaluated. If 10° is between $β_{42}$ and $β_{43}$, then the corresponding ESV values $ESV_{42}$ and $ESV_{43}$ are interpolated to produce an interpolated ESV value $IESV_{41}$. The interpolated ESV value $IESV_{41}$ is assigned to β=10° and target depth $Z_{T4}$ as shown in Table IV. As a result of repeating step (g) for each target depth, Table II is expanded to that shown by Table IV.

TABLE IV

| β (degrees) | 10 | 12 | 14 | 16 | $β_M$ |
|---|---|---|---|---|---|
| $Z_T$ (feet) |  |  |  |  |  |
| $Z_{T1}$ | $IESV_{11}$ | $IESV_{12}$ | $IESV_{13}$ | $IESV_{14}$ | $IESV_{15}$ |
| $Z_{T2}$ | $ESV_{21}$ | $IESV_{21}$ | $IESV_{23}$ | $IESV_{24}$ | $IESV_M$ |
| $Z_{T3}$ | $IESV_{31}$ | $IESV_{32}$ | $IESV_{33}$ | $IESV_{34}$ | $IESV_M$ |
| $Z_{T4}$ | $IESV_{41}$ | $IESV_{42}$ | $IESV_{43}$ | $IESV_{44}$ | $IESV_{4M}$ |

TABLE IV-continued

| β (degrees) | 10 | 12 | 14 | 16 | $\beta_M$ |
|---|---|---|---|---|---|
| $Z_{T5}$ | $IESV_{51}$ | $IESV_{52}$ | $IESV_{53}$ | $IESV_{54}$ | $ESV_{5M}$ |
| $Z_{T6}$ | $IESV_{61}$ | $IESV_{62}$ | $IESV_{63}$ | $IESV_{64}$ | $IESV_{6M}$ |
| $Z_{TN-1}$ | $IESV_{(N-1)1}$ | $IESV_{(N-1)2}$ | $IESV_{(N-1)3}$ | $IESV_{(N-1)4}$ | $ESV_{(N-1)M}$ |
| $Z_{TN}$ | $IESV_{N1}$ | $IESV_{N2}$ | $ESV_{N3}$ | $IESV_{N4}$ | $IESV_{NM}$ |

As a result of the steps above and as shown in Table IV, the resulting ESV matrix is two-dimensional wherein the elevational angle β forms one dimension and the target depth $Z_T$ forms the other dimension. Thus, if n different $Z_T$ values and m different β values are specified, then the ESV matrix would be an (n×m) matrix. As a result, only the elevation angle β and the target depth $Z_T$ need to be known in order to use the complete ESV matrix in Table IV. Therefore, in a constant-pinger-depth hydrophone survey wherein the source depth $Z_A$ is fixed, the ESV is determined after $Z_B$ and β are specified.

To facilitate understanding the method of the present invention and in particular, use of the ESV matrix, several examples are provided below.

It is determined that an actual target is at depth $Z_{T4}$ and the elevation angle β is 14°. As shown in the ESV matrix, i.e., Table IV, for a target depth $Z_{T4}$ and β=14°, the effective sound velocity between the source of the sound energy located at depth $Z_S$ and the target located at depth $Z_{T4}$ is $IESV_{43}$. If a personal computer is used and the ESV matrix shown in Table IV is stored in memory, the user will input the target depth $Z_{T4}$ and β with a keyboard and a software program will effect a scan of the ESV matrix and output on a display screen the ESV value that is assigned to that particular depth and elevation angle.

It is determined that an actual target is at depth $Z_{T4}$ and the elevation angle β is 13°. As shown in Table IV, there is no direct ESV value for a target depth $Z_{T4}$ and β=13°. The uniform set of β values is then scanned in order to locate a pair of successive β values such that β=13° is between the pair of successive β values. As can be seen in Table IV, such a pair of successive β values from the uniform comprises β=12° and β=14°. The next step is to perform a linear interpolation on the ESV values that are associated with β=12° and β=14° and correspond to target depth $Z_{T4}$. Thus, a linear interpolation is performed on $IESV_{42}$ and $IESV_{43}$ to produce an ESV value for a target depth $Z_{T4}$ and an elevation angle β of 13°.

It is determined that an actual target is at depth $Z_{TB}$ that is between depths $Z_{T4}$ and $Z_{T5}$ and the elevation angle β is 15°. As shown in Table IV, there is no direct ESV value for a target depth $Z_{TB}$ and β=15°. The uniform set of β values is then scanned in order to locate a pair of successive β values such that β=15° is between the pair of successive β values. As can be seen in Table IV, β=15° is between β=14° and β=16° of the uniform set. The next step is to perform a 2 (two) dimensional linear interpolation on the ESV values that are associated with β=14° and β=16° and correspond to target depths $Z_{T4}$ and $Z_{T5}$. Thus, a 2-dimensional linear interpolation is performed on $IESV_{42}$, $IESV_{44}$, $IESV_{53}$, and $IESV_{54}$ to produce an ESV value for a target depth $Z_{TB}$ and an elevation angle β of 15°.

Figure 2:
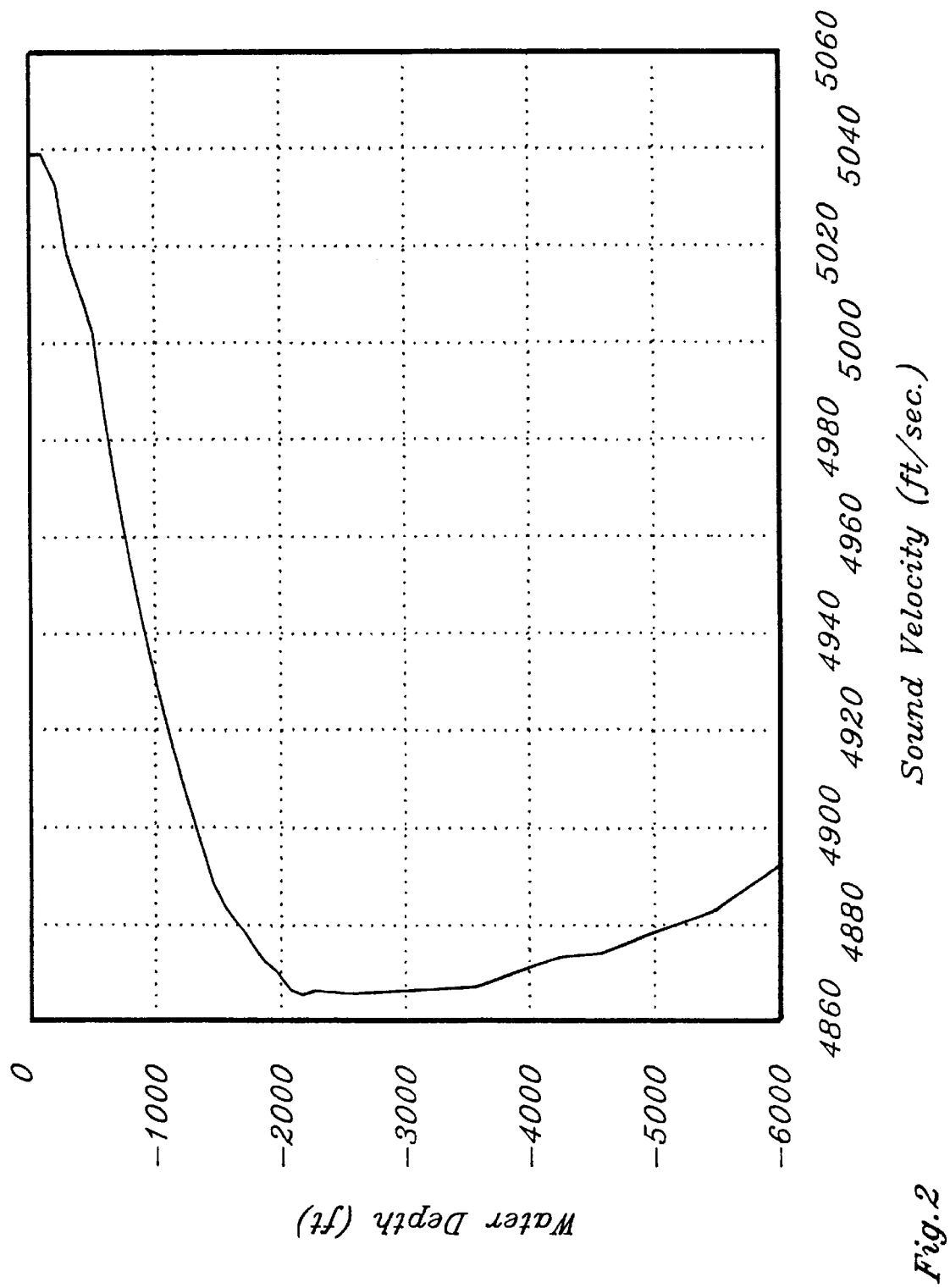
FIG. 2 is the sound velocity profile of the Barking Sands Tactical Underwater Range, hereinafter designated as BARSTUR.
Figure 3:
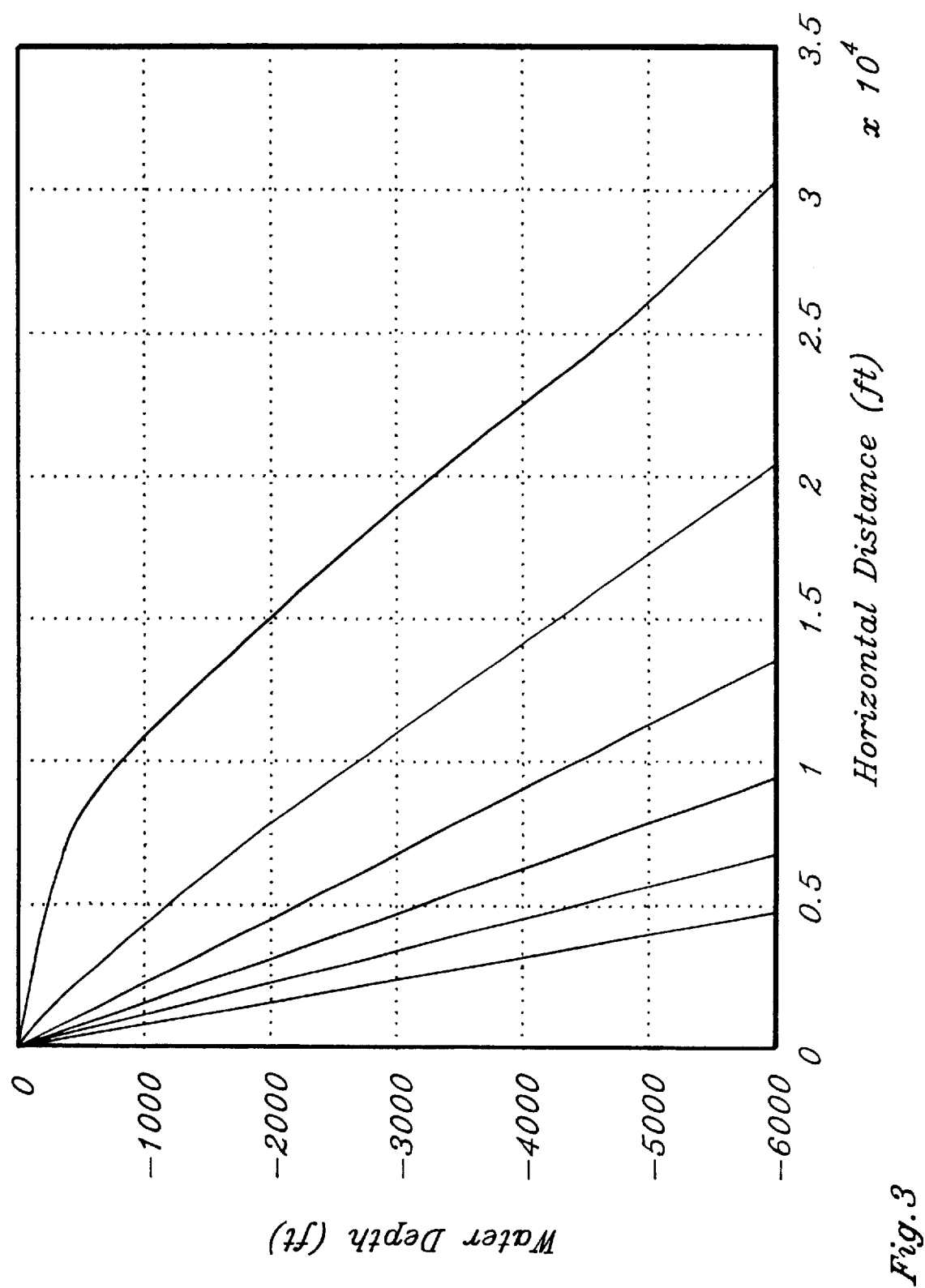
FIG. 3 is ray tracing diagram based on the sound velocity profile of FIG. 2 for rays having various grazing angles.

The accuracy of the method of the present invention was verified by a set of numerical examples. As part of the test, the data generated by method of the present invention was compared to the conventional Taylor series based method. The sound velocity profile (SVP) of BARSTUR (Barking Sands Tactical Underwater Range) was used to implement the test. Referring to FIG. 2, the SVP of the BARTSUR was measured from the ocean surface to a depth of 6000 feet. Since the maximum value of the SVP is located near the surface of the ocean, rays emitted from the ocean surface with very small grazing angles can still propagate to a depth of 6000 feet. FIG. 3 shows a ray tracing diagram for rays having grazing angles $X_A$ of 2°, 10°, 20°, 30°, 40°, and 50° at ocean surface.

A fine resolution was used in representing grazing angle $X_A$ values during the generation of the ESV matrix in order to generate a highly accurate ESV matrix. In the present test, the grazing angles $X_A$ chosen are shown in Table V.

TABLE V

| Set | Ranges of Grazing Angles $X_A$ | Increment |
|---|---|---|
| 1 | 1° to 14° | 0.25° |
| 2 | 15° to 30° | 0.5° |
| 3 | 32° to 50° | 2.0° |
| 4 | 55° to 90° | 5.0° |

The four sets of elevation angles shown in Table VI were used to generate the ESV matrix.

TABLE VI

| Set | Ranges of Elevation Angles β | Increment |
|---|---|---|
| 1 | 2° to 14° | 0.5° |
| 2 | 15° to 30° | 1.0° |
| 3 | 32° to 50° | 2.0° |
| 4 | 55° to 90° | 5.0° |

Each set of elevation angles β is comprised of a range of angles that starts at a smaller angle and increases to a large angle in predetermined increments. For example, the range of elevation angles of Set 1 is defined as the elevation angles from 2° to 14°, inclusive, in increments of 0.5°. Non-uniform resolutions were chosen as a compromise between the required accuracy and the available computer memory storage.

Figure 4:
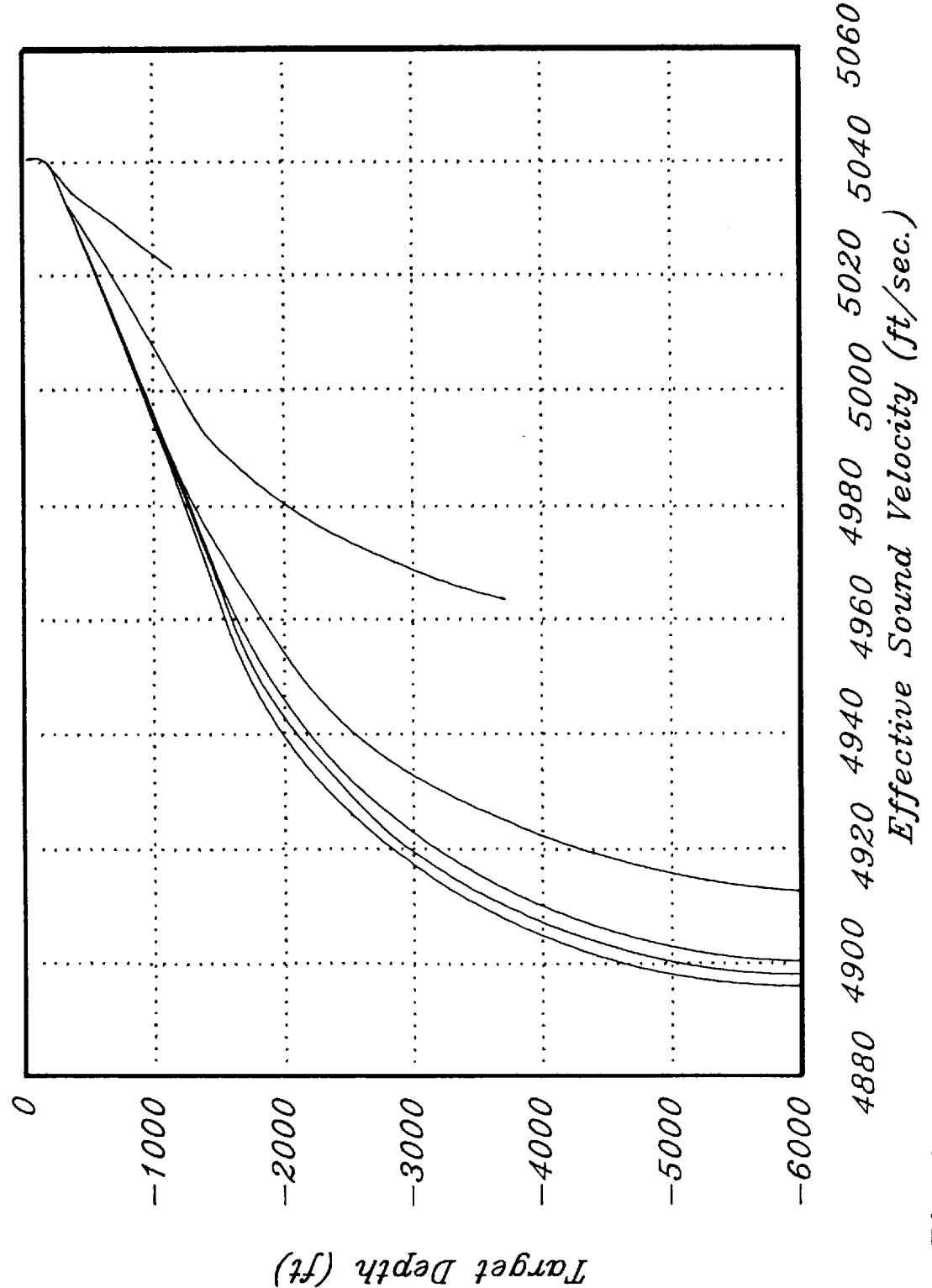
FIG. 4 is a plot of effective sound velocity as a function of depth for different elevation angles wherein the effective sound velocity for each particular depth and elevation angle was determined by the method of the present invention and based on the sound velocity profile of FIG. 2.

Referring to FIG. 4, there is shown a diagram of the ESV values generated by the method of the present invention as a function of target depth for elevation angles 2°, 5°, 10°, 15°, 20°, and 90° wherein the source depth is equal to zero, i.e., the ocean surface. The ESV curves for elevation angles 2° and 5° terminate before they can reach the depth of 6000 feet because it is not possible for any direct, monotonic ray of such small elevation angles to reach deeper ocean sites. According to the test results, a grazing angle of 2° corresponds to the elevation angle of 11.3° when the target depth is 6000 feet. When the target depth is equal to 5000 feet, a grazing angle of 2° results in an elevation angle of 10.8°.

Figure 5:
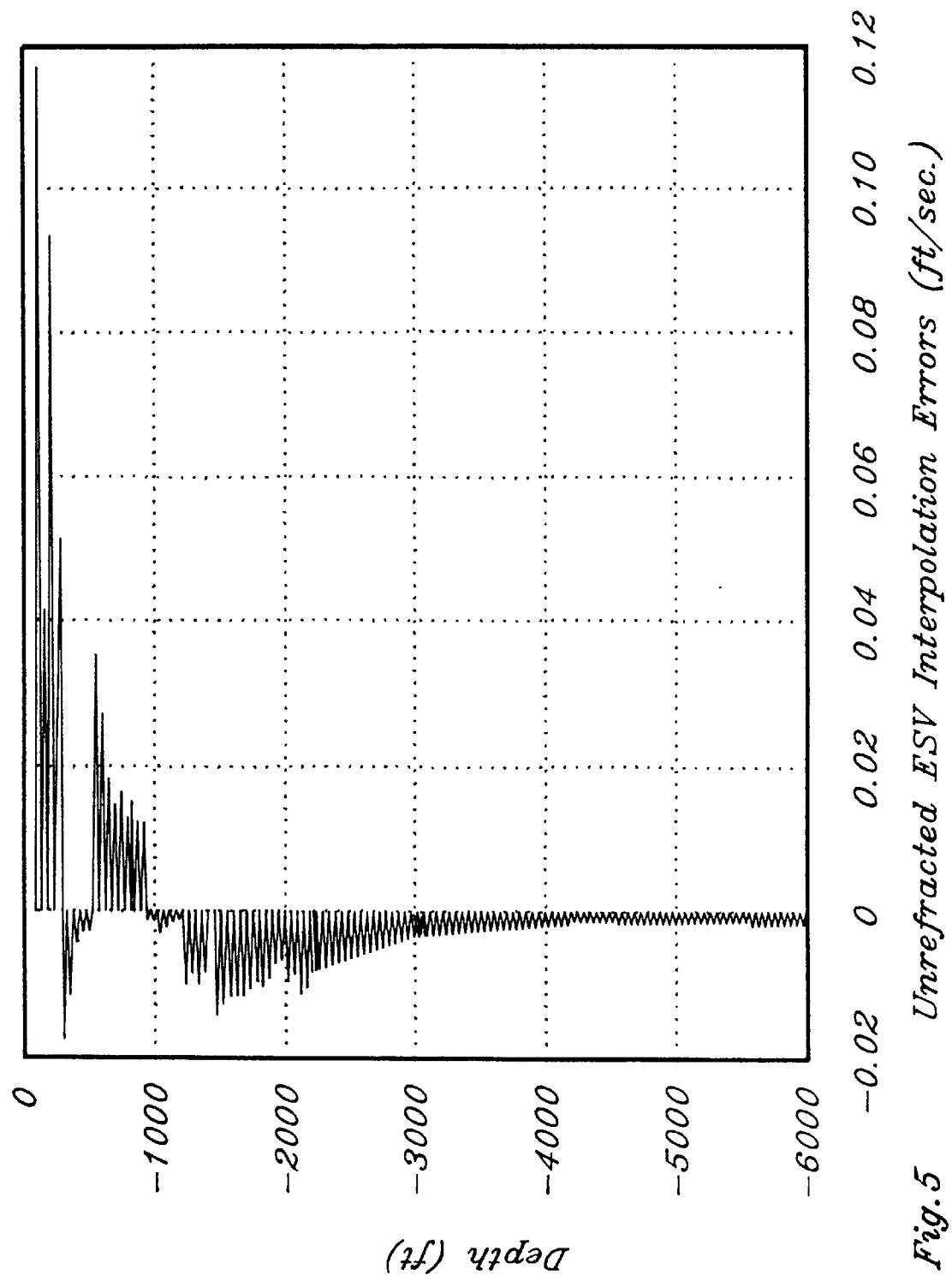
FIG. 5 is a diagram illustrating the difference between the effective sound velocity determined by the method of the present invention and the effective sound velocity determined by the ray tracing method.

FIG. 5 shows the ESV error produced by the method of the present invention as a function of water depth for non-refracted (β=90°) rays. As shown in FIG. 5, the depth resolution is 50 feet (uniformly) and the plotting depth interval is 10 feet, i.e., estimations of ESV are made every 10 feet and based upon the pre-generated ESV matrix with a depth resolution of 50 feet. Thus, the interpolation errors were reduced to zero every 50 feet.

Analysis of the test results showed that the maximum error was about 0.1 ft/sec at very shallow sites. Therefore, the 50 foot depth resolution is sufficient for practical applications. For deeper water sites, depth resolutions greater than 50 feet can be used in order to reduce the memory storage space required for the ESV matrix. In order to reduce the required memory storage space, it is preferred that the generated ESV matrix be just large enough to cover the possible range of target depths.

Figure 6A:
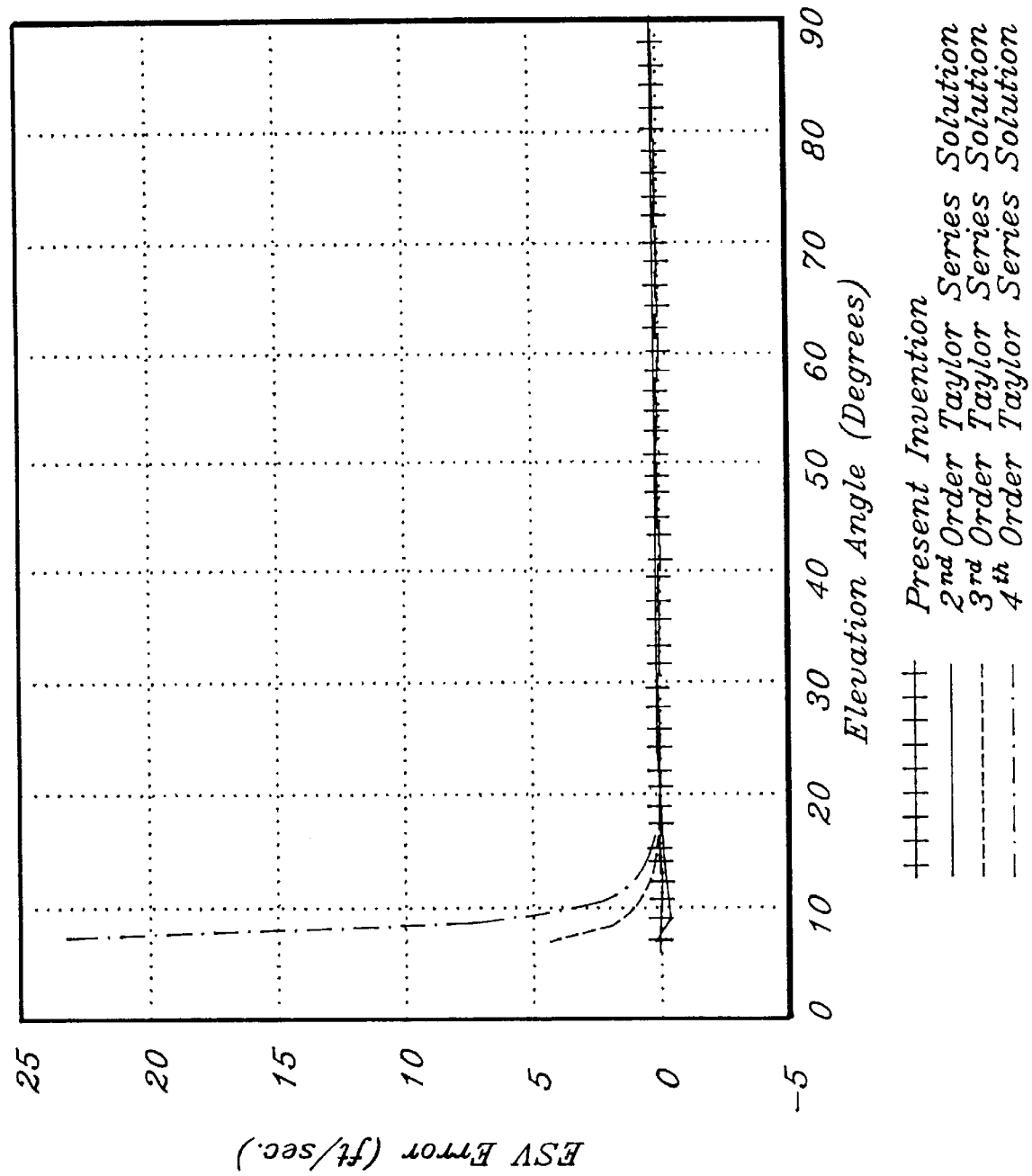
FIG. 6A is a plot illustrating ESV error at a target depth of 2000 feet for the method of the present invention and the $2^{nd}$, $3^{rd}$, and $4^{th}$ order Taylor Series solutions.
Figure 6B:
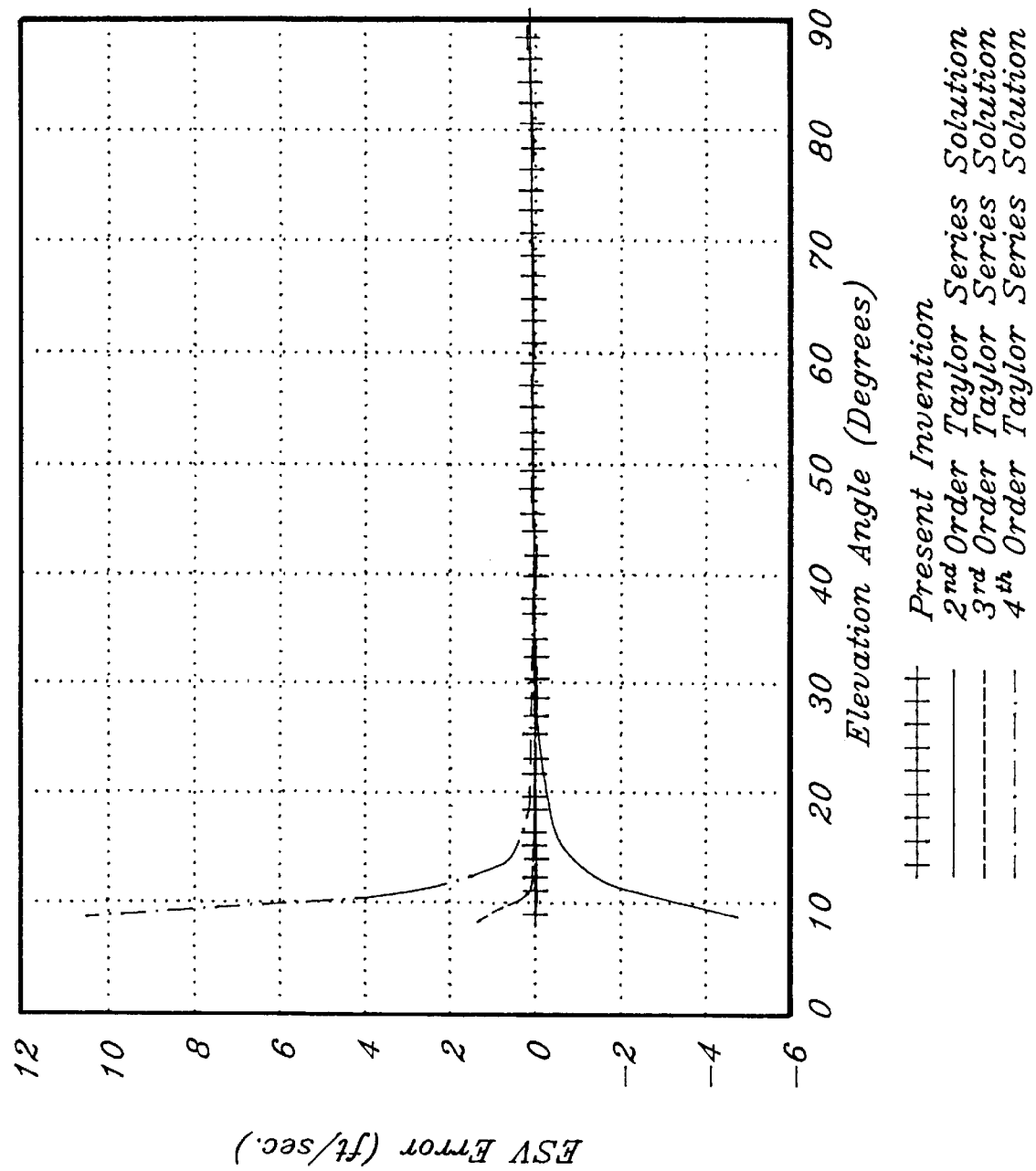
FIG. 6B is a plot illustrating ESV error at a target depth of 3000 feet for the method of the present invention and the $2^{nd}$, $3^{rd}$, and $4^{th}$ order Taylor Series solutions.
Figure 6C:
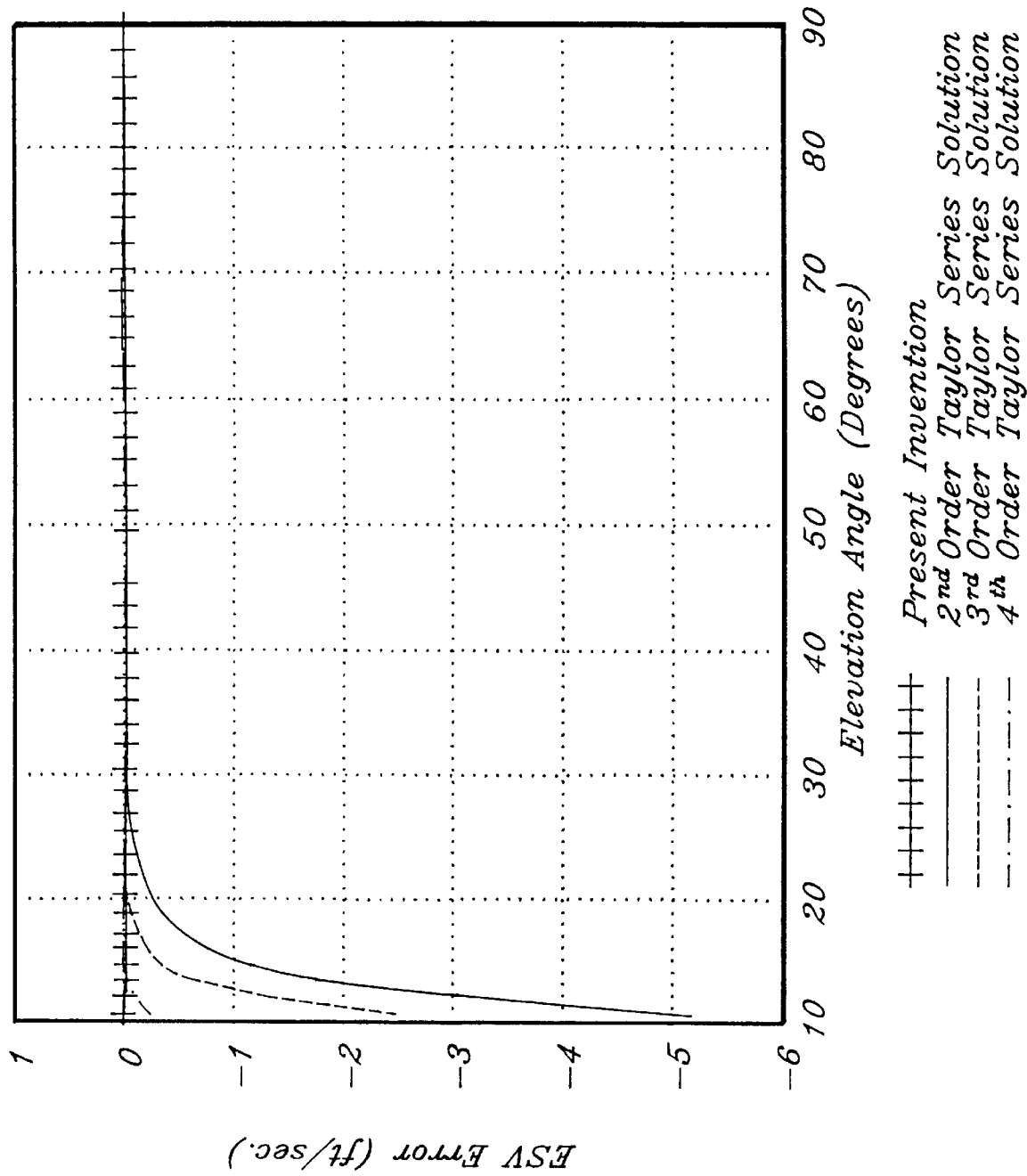
FIG. 6C is a plot illustrating ESV error at a target depth of 6000 feet for the method of the present invention and the $2^{nd}$, $3^{rd}$, and $4^{th}$ order Taylor Series solutions.

As part of the test to verify the accuracy and reliability of the method of the present invention, the ESV values produced by the method of the present invention were compared to the results generated by the Taylor Series based method. The ESV values produced by the ray tracing method were used as a benchmark. The Taylor Series based method can generally provide very accurate ESV estimations for large elevation angles, e.g., $\beta > 30°$. However, the estimations corresponding to smaller elevation angles are often poor. FIGS. 6A–C show ESV error as a function of elevation angle for the $2^{nd}$, $3^{rd}$, and $4^{th}$ order Taylor Series solution, and for the method of the present invention. Referring to FIG. 6A, the $2^{nd}$ order Taylor Series solution is better than the $3^{rd}$ and $4^{th}$ Taylor Series solutions when the target depth is 2000 feet. Referring to FIG. 6B, the $3^{rd}$ order Taylor Series solution is better than the $2^{nd}$ and $4^{th}$ Taylor Series solutions when the target depth is 3000 feet. Referring to FIG. 6C, the $3^{rd}$ order Taylor Series solution is better than the $2^{nd}$ and $3^{rd}$ Taylor Series solutions when the target depth is 6000 feet. Thus, neither the lower-order nor the higher-order Taylor Series solution is consistently superior to the other Taylor Series solutions. Furthermore, as can be seen in FIGS. 6A–C, the Taylor Series based method results in an ESV error of 5 feet/sec. as the elevation angle approaches 10°. Such an error will appear to be very large for hydrophone surveys or ship tracking. On the other hand, the method of the present invention yields a 0.1 ft./sec. error, regardless of how small the elevation angle.

The method has been described above in terms of determining the ESV based on two controlling parameters, i.e., target depth $Z_T$ and elevation angle $\beta$. This known as two-dimensional tracking. In a two-dimensional tracking scenario, the tracking object is of a constant depth but not the same depth as the hydrophones. However, it is to be understood that the method of the present invention may be implemented with more or less than two controlling parameters. For example, the method of the present invention may be used in three-dimensional tracking scenarios. In such a situation, the method of the present invention can be implemented with one ESV matrix generated for each hydrophone.

The method of the present invention does not require any data analyses to establish empirical formulas among the input parameters and the desired output parameters. In a preferred embodiment, the ESV matrix is generated with a resolution that achieves an accuracy that is the same as or higher than the conventional methods discussed above. The method of the present invention is relatively more efficient than the iterative ray-tracing method.

In shallow water applications, the method of the present invention provides accurate and reliable results because the ESV matrix is relatively small and the estimated (or interpolated values are highly accurate. The method of the present invention can also be used for deep water applications.

Since the ESV matrix is based upon direct, monotonic ray tracing, no solution will be reported when the elevational angle $\beta$ is so small that direct, monotonic ray tracing is not possible. Thus, the method of the present invention can be used with the theoretical critical (smallest) elevation angles $\beta$ which vary with target depth $Z_T$. The method of the present invention also automatically eliminates unwanted solutions, such as reflected and/or reversal path solutions. On the other hand, the conventional methods impose a relatively arbitrary critical elevation angle, which is typically larger than the true critical elevation article, in order to avoid erroneous solutions. This technique used by in the conventional methods can consequently result in the elimination of useful data.

The method of the present invention can be implemented with a variety of software and hardware systems. For example, the method of the present invention is implemented on a personal computer or microprocessor wherein a user inputs the controlling parameters $\beta$ and $Z_T$ via a keyboard. Input data, intermediate tables or matrices and the final ESV matrix may be stored in memory and/or on a diskette and displayed on a monitor. Hard copies can be printed out by commercially available ink-jet or laser jet printers. In another example, the method of the present invention is implemented with the MATLAB™ software system. In a preferred embodiment, calculations, interpolations and evaluation of numerical data are implemented with software and logic circuitry and data storage circuitry that have sufficient data-bit capacity to ensure highly accurate results.

In another embodiment, the method of the present invention may be implemented as part of a larger computerized tracking system wherein the controlling parameters $\beta$ and $Z_T$ are pre-determined by other electronic and computerized components of a first subsystem and then fed into a second subsystem that implements the method of the present invention.

Thus, the method of the present invention achieves the objects set forth above. Specifically, the method of the present invention:

a) effects determination of an ESV value for a depth and elevation angle associated with an actual target in relatively less time than the conventional methods discussed above;

b) provides accurate and consistent measurements;

c) can be implemented with a variety of hardware and software systems and components; and d) can be implemented at a relatively low cost.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for determining the effective sound velocity between underwater points, the method comprising the steps of:

providing a device for determining the effective sound velocity between the underwater points;

feeding into the device the sound velocity profile from a source of sound energy located at an initial depth to a predetermined final target depth;

feeding into the device a predetermined set of grazing angles;

feeding into the device a predetermined number of target depths between the initial depth and the final target depth;

calculating for each grazing angle and target depth a corresponding elevation angle and an effective sound velocity;

feeding into the device a predetermined uniform set of elevation angles;

determining for each elevation angle of the uniform set a pair of calculated elevation angles that correspond to a pair of successive grazing angles and a particular target depth wherein the particular elevation angle of the uniform set is between the pair of calculated elevation angles;

interpolating the calculated effective sound velocity values associated with each elevation angle of the pair of calculated elevation angles to produce an interpolated effective sound velocity;

repeating for each target depth used between the initial depth and the final depth the above-mentioned steps of determining for each elevation angle of the uniform set of pair of calculated elevation angles and interpolating the calculated effective sound velocity values;

feeding parameters associated with an actual target, the parameters comprising an actual target depth and an actual target elevation angle; and selecting as the effective sound velocity between the source of sound energy and the actual target the interpolated effective sound velocity that corresponds to an elevation angle of the uniform set and a target depth that matches the actual target elevation angle and actual target depth, respectively.

2. The method according to claim 1 wherein the step of feeding into the device the sound velocity profile further comprises providing the initial depth.

3. The method according to claim 1 wherein in the step of feeding into the device a predetermined set of grazing angles further comprises separating the grazing angles by a predetermined increment.

4. The method according to claim 1 wherein the step of feeding into the device a predetermined number of target depths further includes the step of separating target depths by a predetermined increment.

5. The method according to claim 1 further comprising the step of storing in a memory storage device the elevation angle and the effective sound velocity calculated in the step of calculating for each grazing angle and target depth a corresponding elevation angle and an effective sound velocity in such a manner that the calculated elevation angle and effective sound velocity are assigned to a particular grazing angle and a particular target depth.

6. The method according to claim 5 wherein the storing step comprises the step of forming a two dimensional array wherein the grazing angles form one dimension and the target depths form the other dimension.

7. The method according to claim 1 further including the step of separating the elevation angles of the uniform set of elevation angles fed in to the step of feeding into the device a predetermined uniform set of angles is accomplished by a predetermined increment.

8. The method according to claim 1 wherein the step of feeding into the device a predetermined uniform set of elevation angles further comprises the step of forming a two-dimensional array wherein the elevation angles of the uniform set forms one dimension and the target depths form the other dimension.

9. The method according to claim 8 further comprising the step of storing the two-dimensional array in a memory storage device.

10. The method according to claim 9 further comprising the step of storing the interpolated effective sound velocity value in the array in such a manner that the interpolated effective sound velocity value is assigned to a particular target depth and elevation angle of the uniform set.

11. The method according to claim 10 wherein in the step of selecting as the effective sound velocity that corresponds to an elevation of the uniform set and a target depth that matches actual target elevation and actual target depth respectively, further comprises the step of scanning the two dimensional array to determine which interpolated effective sound velocity corresponds to a target depth and elevation angle that matches the actual target depth and actual target elevation angle, respectively.

12. The method according to claim 1 wherein selecting the step of selecting as the effective sound velocity that corresponds to an elevation of the uniform set and a target depth that matches actual target elevation and actual target depth respectively, comprises the steps of:

determining if there is a target depth that matches the actual target depth;

determining if there is an elevation angle that matches the actual target elevation angle; and selecting the interpolated effective sound velocity that corresponds to the target depth and elevation angle determined in the steps of determining target and elevation angle matching, respectively, as the effective sound velocity between the source of sound energy and the actual target.

13. The method according to claim 12 wherein in the steps of determining target depth and elevation angle matching, if it is determined that there is a target depth that matches the actual target depth and there is no elevation angle of the uniform set that matches the actual target elevation angle, then the method further comprises the steps of:

locating a pair of successive elevation angles in the uniform set such that the actual target elevation angle is between the pair of successive elevation angles in the uniform set; and interpolating the effective sound velocities corresponding to the pair of successive elevation angles of the uniform set and the target depth to produce an effective sound velocity between the source of sound energy and the actual target.

14. The method according to claim 12 wherein in the steps of target depth and elevation angle matching, if it is determined that there is no target depth that matches the actual target depth and there is an elevation angle of the uniform set that matches the actual target elevation angle, then the method further comprises the steps of:

locating a pair of successive target depths such that the actual target depth is between the pair of successive target depths; and interpolating the effective sound velocities corresponding to the pair of successive target depths and the elevation angle of the uniform set to produce an effective sound velocity between the source of sound energy and the actual target.

15. The method according to claim 12 wherein in the steps of target depth and elevation angle matching, if it is determined that there is no target depth that matches the actual target depth and there is no elevation angle of the uniform set that matches the actual target elevation angle, then the method further comprises the steps of:

locating a pair of successive target depths such that the actual target depth is between the pair of successive target depths;

locating a pair of successive elevation angles of the uniform set such that the actual target elevation angle is between the pair of successive elevation angles of the uniform set; and interpolating the effective sound velocities corresponding to the pair of successive target depths and the pair of successive elevation angles of the uniform set to produce an effective sound velocity between the source of sound energy and the actual target.

16. A system for determining the effective sound velocity between underwater points, comprising:

a device for determining the effective sound velocity between the underwater points;

means for feeding into the device the sound velocity profile from a source of sound energy located at an initial depth to a predetermined final target depth;

means for feeding into the device a predetermined set of grazing angles;

means for feeding into the device a predetermined number of target depths between the initial depth and the final target depth;

means for calculating for each grazing angle and target depth a corresponding elevation angle and an effective sound velocity;

means for feeding into the device a predetermined uniform set of elevation angles;

means for determining for each elevation angle of the uniform set a pair of calculated elevation angles that correspond to a pair of successive grazing angles and a particular target depth wherein the particular elevation angle of the uniform set is between the pair of calculated elevation angles;

means for interpolating the calculated effective sound velocity values associated with each elevation angle of the pair of calculated elevation angles to produce an interpolated effective sound velocity;

means for repeating the steps of determining for each elevation angle a pair of matching grazing angles and a particular target depth for each target depth fed in the step of feeding into the device a predetermined number of target depths between the initial depth and the final depth;

means for feeding parameters associated with an actual target, the parameters comprising an actual target depth and an actual target elevation angle; and means for selecting as the effective sound velocity between the source of sound energy and the actual target the interpolated effective sound velocity that corresponds to an elevation angle of the uniform set and a target depth that matches the actual target elevation angle and actual target depth respectively.

17. The system according to claim 16 further comprising a memory storage device for storing the elevation angle and the effective sound velocity calculated in the step of calculating for each grazing angle and target depth a corresponding elevation angle and an effective sound velocity in such a manner that the calculated elevation angle and effective sound velocity are assigned to a particular grazing angle and a particular target depth and the system further comprises:

first means for locating a pair of successive target depths such that the actual target depth is between the pair of successive target depths;

second means for locating a pair of successive elevation angles of the uniform set such that the actual target elevation angle is between the pair of successive elevation angles of the uniform set;

third means for locating a pair of successive elevation angles in the uniform set such that the actual target elevation angle is between the pair of successive elevation angles in the uniform set if there is no elevation angle of the uniform set that matches the actual target elevation angle;

a first interpolating means for interpolating the effective sound velocities corresponding to the pair of successive elevation angles of the uniform set and the target depth to produce an effective sound velocity between the source of sound energy and the actual target;

fourth means for locating a pair of successive target depths such that the actual target depth is between the pair of successive target depths if there is no target depth that matches the actual target depth;

a second interpolating means for interpolating the effective sound velocities corresponding to the pair of successive target depths and the elevation angle of the uniform set to produce an effective sound velocity between the source of sound energy and the actual target;

fifth means for locating a pair of successive target depths such that the actual target depth is between th e pair of successive target depths if there is no target depth that matches the actual target depth;

sixth means for locating a pair of successive elevation angles of the uniform set such that the actual target elevation angle is between the pair of successive elevation angles of the uniform set if there is no elevation angle of the uniform set that matches the actual target elevation angle; and a third interpolating means for interpolating the effective sound velocities corresponding to the pair of successive target depths and the pair of successive elevation angles of the uniform set to produce an effective sound velocity between the source of sound energy and the actual target.

18. The system according to claim 17 further comprising means for forming a first array wherein the grazing angles form one dimension of the array and the target depths form another dimension.

19. The system according to claim 1 further comprising means for forming an array wherein the elevation angles of the uniform set forms one dimension of the array and the target depths form another dimension.

20. The system according to claim 19 further comprising a storage device for storing the array and the interpolated effective sound velocity in such a manner that the interpolated effective sound velocity is assigned to a particular target depth and an elevation angle of the uniform set means for scanning the array to determine which interpolated effective sound velocity corresponds to a target depth and elevation angle of the uniform set that matches the actual target depth and actual target elevation angle, respectively.

* * * * *